United States Patent
Thomas

(10) Patent No.: US 6,193,270 B1
(45) Date of Patent: Feb. 27, 2001

(54) ARRANGEMENT FOR FASTENING A GAS GENERATOR

(75) Inventor: Michael Thomas, Grosswallstradt (DE)

(73) Assignee: Petri AG, Aschaffenburg (DE)

(*) Notice: Subject to any disclaimer, the term of this patent is extended or adjusted under 35 U.S.C. 154(b) by 0 days.

(21) Appl. No.: 09/341,452

(22) PCT Filed: Jan. 13, 1998

(86) PCT No.: PCT/DE98/00155

§ 371 Date: Jul. 9, 1999

§ 102(e) Date: Jul. 9, 1999

(87) PCT Pub. No.: WO98/31568

PCT Pub. Date: Jul. 23, 1998

(30) Foreign Application Priority Data

Jan. 14, 1997 (DE) .......................................... 297 01 337 U

(51) Int. Cl.⁷ .................................................. B60R 21/26
(52) U.S. Cl. ....................................... 280/728.2; 280/740
(58) Field of Search ................................ 280/728.2, 740, 280/732

(56) References Cited

U.S. PATENT DOCUMENTS

| | | | |
|---|---|---|---|
| 4,191,392 | 3/1980 | Barnett | 280/740 |
| 5,257,815 | 11/1993 | Bachelder et al. | 280/728.2 |
| 5,328,203 | 7/1994 | Baba et al. | 280/728.02 |
| 5,458,363 | 10/1995 | Garner et al. | 280/728.1 |
| 5,490,690 | 2/1996 | Mihm | 280/728.2 |
| 5,533,750 | 7/1996 | Karlow et al. | 280/730.2 |
| 5,704,634 | * 1/1998 | Wallner et al. | 280/728.2 |

FOREIGN PATENT DOCUMENTS

| | | |
|---|---|---|
| 43 10 173 A1 | 10/1993 | (DE) . |
| 42 93 648 T1 | 4/1995 | (DE) . |
| 196 22 319 A1 | 12/1996 | (DE) . |
| 0 631 908 A1 | 1/1995 | (EP) . |
| 0 686 532 A1 | 12/1995 | (EP) . |
| 08040166 | 2/1996 | (JP) . |
| 08080798 | 3/1996 | (JP) . |
| 8-318803 | 12/1996 | (JP) . |

* cited by examiner

Primary Examiner—Peter C. English
(74) Attorney, Agent, or Firm—Christie, Parker & Hale, LLP

(57) ABSTRACT

An arrangement for fastening a gas generator in a housing, in particular for fastening a tubular gas generator in a diffuser of an airbag module has a plastic adaptor located between the housing and the gas generator at an open end of the housing. The gas generator is screwed to the housing at the end of the housing opposite the open end. The housing also adjoins the gas generator near the open end of the housing in the operational direction of a fastening screw at a point next to the adapter and/or in the region of an opening in the adapter.

11 Claims, 2 Drawing Sheets

ARRANGEMENT FOR FASTENING A GAS GENERATOR

FIELD OF THE INVENTION

The invention relates to an arrangement for fixing a gas generator in a housing, more particularly for fixing a tubular gas generator in a diffuser of an airbag module.

BACKGROUND OF THE INVENTION

It is known to arrange a gas generator, more particularly a tubular gas generator, inside a housing, more particularly in a diffuser which has an opening for inserting the gas generator. The diffuser encloses the gas generator on all sides and has a larger diameter than the gas generator (EP A 0 631 908 A1).

It is further known to connect the gas generator by its end faces to the diffuser. Owing to the larger diameter of the diffuser at its opening, an adapter compensates for the differences in the diameters of the diffuser and the gas generator. After sliding the generator into the diffuser, the generator adjoins the adapter and is screwed on the opposite side to the diffuser so that it is tensioned against the adapter.

It is known to use sheet steel parts as the adapter. The drawback with the sheet steel parts is that they are expensive and heavy and they can only be fitted on the diffuser by means of a device. This has a negative effect on the manufacturing sequence and incurs additional assembly costs.

The object of the invention is to allow the assembly of a gas generator, more particularly a tubular gas generator in a housing, more particularly in a diffuser by using an adapter in a cost-effective manner without adversely affecting the manufacturing sequence.

SUMMARY OF THE INVENTION

An arrangement for fixing a gas generator in a housing, more particularly for fixing a tubular gas generator in a diffuser of an airbag module includes a housing that has an open end for inserting the gas generator and the generator adjoins this end of the housing with the interposition of an adapter, preferably a plastic adaptor having openings. At the opposite end of the housing, the generator is screwed into the housing. The housing directly adjoins the gas generator in the active direction of the fastening screw through the openings in the adapter and/or at a point adjacent to the adapter. The housing preferably has at least one web which runs through the adapter or runs next to the adapter to adjoin an end side of the gas generator.

This arrangement has the advantage that the gas generator is tensioned directly with the housing as the generator is screwed into the housing. The plastic adapter lies between the housing and the gas generator and is only stressed axially with a slight force. As a result of this reduced strain any settling of the plastic adapter is eliminated. The sealing action also remains, even in the event of thermal action. Compared to a sheet metal design, the plastic adapter is cheaper and lighter. A further advantage is that the adapter can be fitted by hand onto the diffuser which has considerable advantages with regard to the assembly time. Additional devices can thereby be avoided.

The web preferably adjoins an end face of a generator flange and it is further expedient if two webs are provided.

BRIEF DESCRIPTION OF THE DRAWINGS

The invention will now be explained with reference to an embodiment shown in the drawings in which.

DETAILED DESCRIPTION OF THE PREFERRED EMBODIMENT

Figure 4:
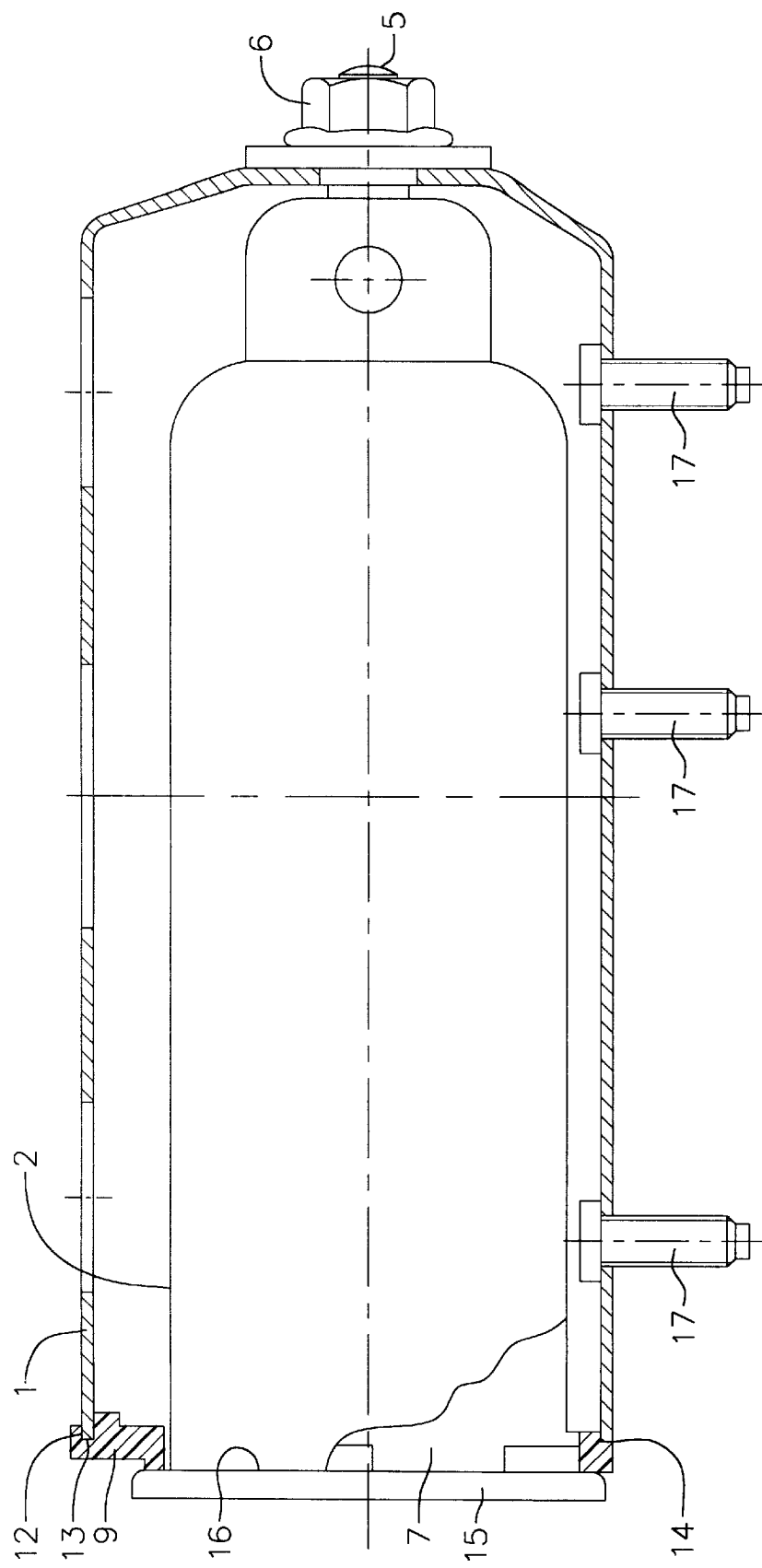
FIG. 4 is a longitudinal sectional view through a diffuser having a gas generator mounted thereon.

A diffuser 1 for a tubular gas generator 2 (shown in FIG. 4) has an open end 3 for inserting the tubular gas generator 2. At the other end of the diffuser is an opening 4 (shown is FIG. 2) for a bolt (fastening screw) 5 of the tubular gas generator. An end of the tubular gas generator is connected to the diffuser by means of a nut 6 and the bolt 5.

Figure 2:
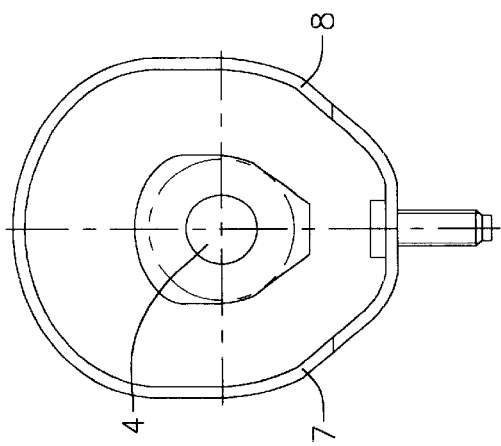
FIG. 2 is a front view of a diffuser.
Figure 1:
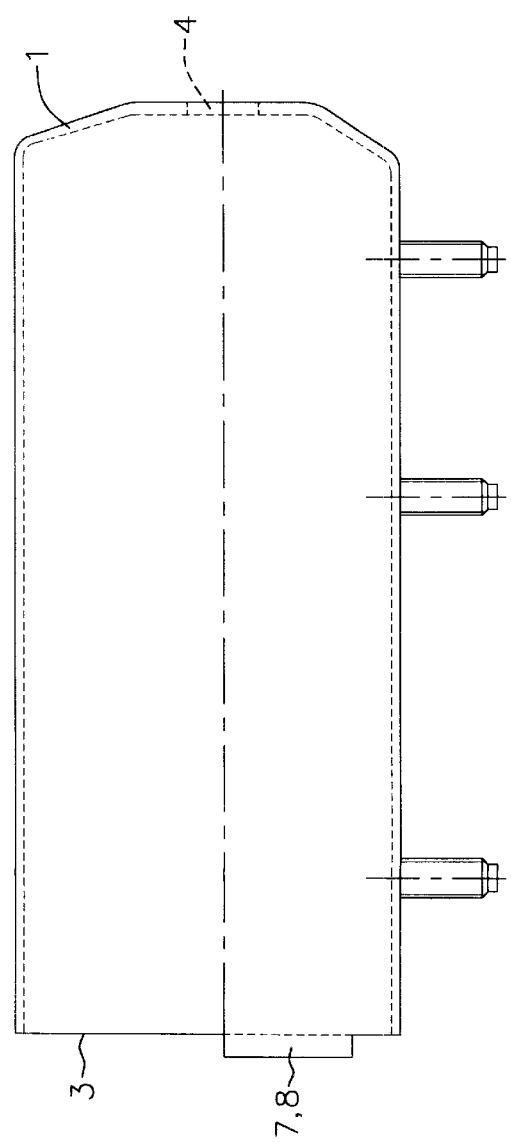
FIG. 1 is a side view of a diffuser.
Figure 3:
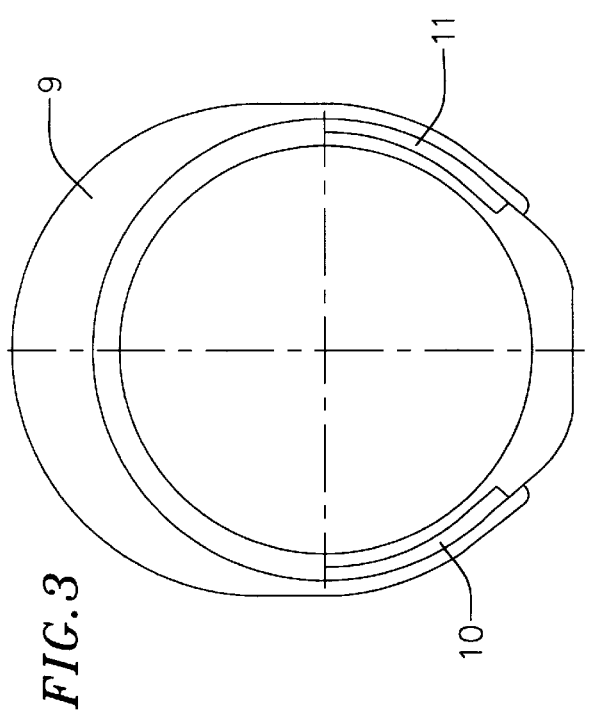
FIG. 3 is a plan view of a plastic adapter.

At the open end 3, the diffuser 1 has two webs 7, 8 (shown in FIGS. 1, 2). Furthermore, a plastic adapter 9 is provided at the open end. The plastic adapter has two openings 10, 11 for receiving the webs 7, 8. The adapter has, in plain view as shown in FIG. 3, an external contour whose path corresponds substantially to an external contour of the diffuser. The adapter has, in the area of its external contour, a groove 12 for receiving an end edge 13 of the diffuser. This groove 12 runs practically over the entire circumference, and extends in a lower area of the diffuser into a ledge 14.

The adapter has, in plan view, an inner contour which corresponds substantially to an outer diameter of the tubular gas generator 2. The gas generator 2 is provided in the area of the adapter with a flange of 15 which has an external diameter such that the gas generator can adjoin the adapter by an end side, preferably a flange 15 with an end face 16.

The fitting of the tubular gas generator is now described below. First the plastic adapter 9 is fitted onto the diffuser 1 whereby the webs 7, 8 extended into the openings 10, 11. The length of the webs and the thickness of the adapter are matched with each other so that the ends of the webs in this phase of assembly still lie by a small amount, e.g. by some hundredths of a millimeter, inside the plastic adapter. The tubular gas generator is then pushed into the diffuser whereby the bolt 5 is guided through the opening 4. By tightening up the nut 6, the tubular gas generator is connected to the diffuser. At the same time that the nut is tightened, the end face 16 of the flange 15 adjoins the plastic adapter. Through further tightening, the plastic adapter is there by slightly deformed so that a sealing action occurs between the plastic adapter and the diffuser or between the adapter and the flange 15. As a result of this slight deformation of the plastic adapter, the webs 7, 8 now directly contact the end face 16 of the flange 15. On tightening up the nut 6 further, the flange 15 and, thus the tubular gas generator, are tensioned directly opposite the diffuser 1 whilst the plastic adapter is not deformed any further.

Following assembly of the tubular gas generator, the diffuser 1 is fixed in the motor vehicle by means of bolts 17.

What is claim is:

1. A gas generator arrangement for an airbag module comprising:

a housing having an open end;

a gas generator insertable into the open end of the housing and screwed to the housing at an end opposite the open end;

a deformable plastic adapter having a first position wherein the adapter is interposed between the gas generator and the open end of the housing, and a second position wherein the adapter is compressed when the housing directly adjoins the gas generator at the open end of the housing offer when screwing the gas generator onto the housing.

2. The arrangement according to claim 1 wherein the housing includes a first web which runs through the adapter and adjoins one end side of the gas generator.

3. The arrangement according to claim 2 wherein the gas generator has a flange, wherein the one end side is an end face of the generator flange.

4. The arrangement according to any one of the preceding claims wherein the housing includes to opposing webs.

5. The arrangement according to claim 1 wherein the gas generator is a tubular gas generator.

6. The arrangement according to claim 1 wherein the housing is a diffuser of the air bag module.

7. The arrangement according to claim 1 wherein the housing and the gas generator are adjoined at a point next to the adapter.

8. The arrangement according to claim 1 wherein the adapter has an opening, wherein the housing and the gas generator are adjoined in the area of the adapter opening.

9. The arrangement according to claim 1 wherein the housing includes a web which runs next to the adapter, and the web adjoins an end side of the gas generator.

10. The arrangement according to claim 9 wherein the gas generator has a flange, wherein the end side is an end face of the generator flange.

11. The arrangement according to claim 1 further comprising a fastening screw for screwing the generator to the housing and wherein the adapter is deformed in the active direction of the fastening screw when moved from the first position to the second position.

* * * * *